United States Patent Office 3,255,127
Patented June 7, 1966

3,255,127
POLYMERIC MATERIALS
Wulf von Bonin, Leverkusen, and Herbert Bartl, Cologne-Stammheim, Germany, assignors to Farbenfabriken Bayer Aktiengesellschaft, Leverkusen, Germany, a German corporation
No Drawing. Filed June 12, 1962, Ser. No. 201,801
Claims priority, application Germany, June 21, 1961, F 34,227
8 Claims. (Cl. 260—2.5)

The present invention relates to a process for polymerizing polymerizable organic compounds in reversed emulsion and polymers obtained in this manner.

Processes have already been proposed whereby polymers with a higher softening point are obtained by polymerising water-insoluble vinyl compounds, such as styrene, or methylmethacrylate, in reversed emulsion. By this process of polymerisation in reversed emulsion, solid polymers are obtained which fill the polymerisation vessel as a porous block. For working up such polymer blocks on an industrial scale and also for drying polymers obtained in this way, which polymers contain large quantities of water occluded in their pores, it is however necessary for these polymer blocks to be comminuted or ground in additional working steps.

It has now been found that polymerisation reactions in reversed emulsion can lead in a technically simple manner to polymers which can advantageously be worked up, if water-insoluble monomers containing at least one polymerisable carbon-carbon double bond are first of all together with water converted into a reversed emulsion of the water-in-oil type, and then the reversed emulsion thus obtained is so dispersed in water that the identity of the dispersed droplets is maintained as a reversed emulsion and the dispersion is thereafter polymerised.

The process according to the invention can be applied quite generally to water-insoluble monomers containing a carbon-carbon double bond which can be subjected to radical polymerisation. More especially there are to be considered water-insoluble monomers containing a terminal $CH_2=C<$— group in its molecule as for example (a) monovinyl aromatic compounds such as styrene or its derivatives or substitution products such as styrenes alkylated in the nucleus or side chains, halogenation products and others, and also (b) aliphatic vinyl compounds, for example vinyl esters such as vinyl acetate, propionate and butyrate (c) esters of acrylic and/or methacrylic acid (d) vinyl halides such as vinylchloride or vinylidene chloride. Besides the afore-mentioned monomers it is also possible to use alone or in admixture with the foregoing mentioned monomers polyolefines, more especially aliphatically conjugated diolefines, such as isoprene, 2,3-dimethyl butadiene, chloroprene.

The present process is of preferred interest for polymerizing monomers as hereinbefore defined of the following group:

(1) styrene (2) esters of methacrylic acid and an aliphatic saturated monohydric alcohol having from 1 up to 6 carbon atoms, such as for example Methacrylic acid methyl ester
Methacrylic acid ethyl ester
Methacrylic acid butyl ester
Methacrylic acid cyclohexyl ester (3) esters of acrylic acid and an aliphatic saturated monohydric alcohol having from 1 up to 6 carbon atoms, such as for example Acryl acid methyl ester
Acryl acid ethyl ester
Acryl acid propyl ester
Acryl acid cyclohexyl ester The process of the present invention is very suitable for the homopolymerisation or copolymerisation of said preferred monomers since the raising of the softening point of the corresponding polymers or copolymers is of great interest.

It is readily possible for the aforementioned monomers to be polymerised by themselves or to subject them to copolymerisation with one another and also with other copolymerisable compounds.

As copolymerisable monomer components of the last-mentioned type which are of interest in this connection, there are to be mentioned the esters of maleic or fumaric acids, more especially maleic acid semiesters such as maleic acid cyclohexyl semiester and fumaric acid diester.

According to a further modification of the present process, it is possible for monomers causing cross-linking reactions to be subjected to the copolymerisation with the aforementioned monomers preferably in amounts of up to 20% by weight related on total amount of monomers. Suitable crosslinking monomers are such having at least two, preferably two or three non conjugated vinyl or allyl groupings. The following are more especially to be mentioned as monomers of this type: divinylbenzene, trivinylbenzene, glycol dimethacrylate, hexahydrotriacrylyl-s-triazine, triallyl cyanurate and unsaturated polyesters based on $\alpha,\beta$-unsaturated dicarboxylic acids and dihydric or polyhydric alcohols, for example maleic acid-ethylene glycol polyesters.

In order to prepare the reversed emulsions, the monomers to be used can be employed both in substance and also dissolved in a solvent which is immiscible with water and which does not inhibit the polymerisation, such as benzene, xylene, hexane, isooctane, ethyl acetate, glycol dimethylether. There are in principle no limits as regards the quantities of the solvents to be considered in this case, provided polymerisation still occurs in, for example, highly diluted solutions. The oil phase to be emulsified to said reversed emulsion, i.e. the mixture of monomer and the solvent should contain not more than 50% by weight of said solvent.

For the conversion of the monomers to be used for the present process into a reversed emulsion of the water-in-oil type, which in its turn is capable of being dispersed in aqueous medium, there are in principle suitable all those emulsifiers which can be used for the production of reversed emulsions of these monomers. The following are to be mentioned as emulsifiers of specific value for the process of this invention.

(1) Slightly hydrophilic fatty acid salts, i.e. more especially alkaline earth metal salts (i.e. magnesium and calcium salts) of long-chain fatty acids (i.e. having between 12 and 20 carbon atoms) such as magnesium oleate, calcium stearate as well as alkalimetal salts of these fatty acids such as hexadecyl sodium phthalate.

(2) Polymers which can be prepared in a manner known per as by grafting polymerisable monovinyl compounds, such as styrene, vinyl esters having from 2 up to 4 carbon atoms in the ester group, acrylates or methacrylates (being esterified with an aliphatic saturated monohydric alcohol of from 1 to 4 carbon atoms) on to polyalkylene oxides and more especially polyethylene oxide having a molecular weight of at least 500 and up to preferably 5000 and which may be substituted or unsubstituted at the terminal groups. Especially are to be considered grafting products wherein 1 to 50 parts by weight of monovinyl monomer are grafted on to 2 to 1 parts by weight of polyalkylene oxide.

(3) Equally suitable are reaction products of polymers carrying free carboxyl groups, especially reaction products of $\alpha$, $\beta$-ethylenically unsaturated dicarboxylic acids containing 4 carbon atoms, fumaric or maleic acid copolymers or fumaric or maleic acid semiester copolymers with alkylene oxides preferably such containing 2–3 carbon atoms such as ethylene oxide or propylene oxide which are likewise obtainable by processes known per se.

Besides the aforementioned preferred emulsifiers there are furthermore suitable emulsifiers of the following types:

(a) Fatty acid esters more especially those of sugars, such as sorbitan monooleate, saccharose monolaurate or dilaurate or monostearate or distearate.

(b) Non-ionic emulsifiers or substances of high molecular weight which have already been used for the production of reversed emulsions can likewise be employed in the present cases. The following are to be mentioned as examples; cyclo-rubber or polymers carrying hydroxyl or free carboxyl groups, such as described for example in copending U.S. patent application Serial No. 114,658. Particularly to be mentioned here are homopolymers and/or copolymers with a base of vinyl monomers which carry a radical containing at least 8 carbon atoms.

(c) In addition, it is possible to use graft polymers of vinyl compounds on water-soluble or hydrophilic substances, such as graft polymers of styrene and similar vinyl monomers on starch. Emulsifiers of the preferred type and as above mentioned under No. 3 i.e. reaction products of carbocyl groups carrying polymers with alkylene oxides can be prepared in a manner known per se by copolymerisation in block, solution or emulsion, with initiators which are usually considered for such purposes, such as peroxidic radical formers.

The copolymers carrying carboxyl groups and to be used for the reaction with alkylene oxides and/or polyols for preparation of said emulsifiers can be obtained by various methods. The introduction of the carboxyl group can for example be obtained by copolymerisation of polymerisable carboxylic acids carrying carbon-carbon double bonds. Suitable carboxylic acids of this type are for example acrylic, methacrylic and maleic acid, maleic acid anhydride, semiesters of maleic acid and fumaric acid, crotonic acid, itaconic acid. On the other hand, it is possible to prepare free carboxyl groups by, for example, saponifying polymers of corresponding carboxylic acid derivatives. Advantageously to be considered for this purpose are monomers of the type of acrylic or methacrylic acid esters. In addition, it is of course also possible for copolymers of semi-esters of unsaturated dicarboxylic acids, such as semiesters of maleic or fumaric acids, to be completely saponified. As alcohol component for the esters or semi-esters which are possibly used, there are to be considered straight-chain or branched aliphatic alcohols, such as methanol, ethanol, propanol, butanol, dodecanol, 2-ethyl hexanol, as well as cyclic alcohols such as cyclohexanol, aromatic alcohols such as benzyl alcohols, etc.

As copolymer components for the aforementioned monomers carrying carboxyl groups or monomers which represent saponifiable carboxylic acid derivatives, there are to be considered: aliphatic vinyl compounds, such as vinyl ester, vinyl acetate, vinyl propionate, vinyl butyrate, acrylic or methacrylic acid esters, with alcohol radicals as already mentioned above, vinyl halides such as vinyl chloride or vinylidene chloride, aromatic vinyl compounds, preferably mono-vinyl compounds such as styrene and derivatives of styrene, aliphatic monoolefines such as ethylene or aliphatically conjugated diolefines, more especially isoprene or butadiene.

As regards the copolymers carrying carboxyl groups and to be used according to the present invention for the production of the emulsifiers, there should be at least 2 free carboxyl groups in the molecule. It is advisable to employ copolymers with 5 to 90% by weight and advantageously 10 to 60% by weight, based on the total quantity of monomers introduced, of copolymerisable unsaturated carboxylic acid, for example arcylic acid, methacrylic acid.

As alkylene oxides for the reaction with copolymers carrying carboxyl groups, there are to be considered alkylene oxides with three-membered or four-membered rings containing oxygen, such as perhaps ethylene oxide, propylene oxide, trimethylene oxide, styrene oxide, epichlorhydrin. With the reaction of the copolymers with alkylene oxides, it is possible to add one or more mols of alkylene oxide for each carboxyl group.

As polyols which can be reacted with the aforementioned polymers carrying free carboxyl groups, there are advantageously to be considered dihydric alcohols such as glycol, propane diols, 1,6-hexane diol, cyclohexane diols, and also polyhydric alcohols such as glycerine, trimethylol propane, ether alcohols such as diglycol and triglycol (polyalkylene oxides) and others.

The reaction of the copolymers carrying carboxyl groups with alkylene oxides or polyalcohols can certainly be carried out in such a way that only a small part of the carboxyl group is esterified, but nevertheless it is advantageous that at least 20% of the carboxyl groups and up to about 100% should be esterified, provision being made by suitable measures for the fact that as far as possible no cross-linking reactions occur (for example low reaction temperature or excess of alkylene oxide or polyol).

Reaction products of alkylene oxides with copolymers of unsaturated dicarboxylic acids, such as maleic acid or fumaric acid, which in some cases are partially esterified, have proved to be particularly effective emulsifiers within the scope of the present invention. Especially to be emphasised in this connection are predominantly copolymers of alternating structure obtained from maleic acid semiesters (i.e. being semi-esterified with an aliphatic or cycloaliphatic saturated alcohol of from 1–18 carbon atoms on the one hand and styrene and isoprene or butadiene on the other hand. The aforesaid maleic acid semi-ester copolymers should in this case be at least to 10% and preferably almost completely esterified by reaction with polyalkylene oxide.

The auxiliary substances for the production of the aforesaid reversed monomer emulsions are dissolved in the monomers which are to be emulsified and, depending on their emulsifying power, are used in quantities from 0.1 to 30% by weight and preferably 0.5 to 15% by weight, based on the total weight of the monomers being used.

Water-soluble or even monomer-soluble radical formers are suitable as polymerisation initiators. For example, Redox systems are to be considered for the present polymerisation process, more especially those which contain alkali metal or ammonium persulphate, hydrogen peroxide, alkali metal or ammonium perborates, percarbonates and perphosphates as the component with an oxidising action. To be mentioned as reducing agents are both sulphur compounds operating in acid medium and of the low valency stages of sulphur, such as alkali metal or ammonium pyrosulphites, alkali metal or ammonium bisulphites, or alkali metal thiosulphates. Alkali metal formaldehyde sulphoxylates, formamidine-sulphinic acid as well as reducing agents which are only effective in alkali medium, such as triethanolamine, diethylene triamine, triethylene tetramine, are also to be considered. It is of course also possible to use these Redox systems in the presence of complex formers, such as pyrophosphates or those of the type of ethylene diamine-tetraacetic acid.

Although these water-soluble polymerisation initiators are preferably added to the quantity of water required for the production of the reversed emulsion, in such a way that the reversed emulsion itself already contains all the activator, the polymerisation initiators can in principle also be supplied to the aqueous dispersing medium after dispersion of the reversed emulsion.

According to a preferred form of the present process, however, monomer-soluble polymerisation initiators are used, such as nitrogen compounds with a tendency to radical decomposition, such as for example azodiisobutyric acid dinitrile, and also organic peroxides, more especially acyl peroxides such as benzoyl, lauroyl or dichlorobenzoyl peroxides; alkyl hydroperoxides such as tert. butyl hydroperoxide, cumene hydroperoxide, p-menthane hydroperoxide; dialkyl peroxides such as di tert. butyl peroxide, percarbonates or hydroperoxides. The monomer-soluble peroxides can also be used in combination with reducing agents as Redox systems. The combination of benzoyl peroxide and p-dimethyl toluidine or cyclohexanone peroxide and cobalt naphthenate are to be mentioned as examples.

The aforementioned polymerisation initiators can be used in the quantities normal for such purposes, i.e. generally in quantities of 0.1 to 5%, in the case of monomer-soluble initiators related to the monomer, or in the case of water-soluble initiators related to the water phase contained in the reversed emulsion.

The reversed emulsion of the monomer is for example prepared by dissolving the emulsifier in the monomer and adding water while stirring. In this connection, the stirring should not be too gentle with low water contents and should not be too violent with high water contents of the formed reversed emulsion, since otherwise a stable reversed emulsion is not formed. Depending on the efficacy of the emulsifier being used, this emulsion can have ratio by weight of monomer to water between 100:5 and 1:80, but preferably between 100:10 and 1:20.

If necessary, the production of the reversed emulsion is carried out with exclusion of air, for example in a steam of nitrogen.

The initially prepared reversed monomer emulsion of the water-in-oil type is thereafter so dispersed in an aqueous phase that, within the droplets of the forming dispersion, the identity of these droplets as a reversed emulsion is maintained. It is true that it is possible in this case to work without dispersion agents, but it is advantageous to have the assistance of such agents. In order to prevent the droplets of the reversed emulsion from being broken and to ensure that they are only moved, it is necessary to work at low stirring speeds and with stirrer devices which are not too efficient, and in certain cases the stirring can be omitted completely.

The water phase in which the reversed emulsion is dispersed according to the process can contain, as dispersion agents, polyvinyl alcohol (preferably of a molecular of between 5000 and 100,000), styrene-maleic acid copolymers (comonomer ratio about 1:1), carboxymethyl cellulose and the like or also dispersion agents of the type of hydrated solid elements, such as magnesium hydroxide or combinations of both types. The quantity of dispersion agent which is used is in this case within the limits of 0.1 to 10%, and advantageously 0.1 to 5%, based on the aqueous dispersion medium.

For dispersing the reversed monomer emulsion, about one-third of its volume of water is sufficient, but it is preferred to work with several times the volume of aqueous phase. In this connection, the ratio of monomer emulsion to aqueous phase between 3:1 and 1:40 has proved particularly advisable.

The polymerisation of the reversed monomer emulsion dispersed in the aqueous phase can be carried out at temperature between 5° C. and, when working under pressure, up to 200° C. However, temperatures between 10° C. and 95° C. are to be considered as preferred.

The polymers obtainable by the process of the invention show after water removal by slight heating or drying in an air stream a higher softening point by comparison with polymers of the same monomers which have been polymerised by the hitherto usual methods in block, solution or normal emulsion (oil-in-water). For example, in the case of polystyrene, the polymers obtained by the present process have softening points higher by about 15 to 35° C. than a block or suspension polymer prepared in the usual way. With polymethyl methacrylate, the softening point is raised by about 10 to 20° C. Because of their porosity, the polymer particles have a high absorption capacity and accelerated swelling in solvents or plasticisers.

Using the process according to the invention, it is possible to obtain, from the monomers of the aforementioned type which can be polymerised in reversed emulsion, polymers which from the outset are obtained in a more finely divided form, i.e. in a form which is particularly advantageous for handling purposes in practice, while in addition the polymers can be dried in a simple and economic manner.

The polymers obtained according to the process of this invention may be employed as materials which maintain the moisture content of closed chambers. By heating the water containing polymers foamed materials may be produced. Furthermore the products according to our process may be employed as soil conditioners.

The parts indicated in the following examples are parts by weight, unless otherwise mentioned.

Example 1

Preparation of the emulsifier used for these examples:

100 parts of polyethylene oxide with a molecular weight of about 1500 (2.4% OH) are stirred with 1.7 parts of maleic acid anhydride for 10 hours at 110° C. The temperature is then raised to 120° C. and, while passing over pure nitrogen, a solution of 1 part of benzoyl peroxide in 100 parts of vinyl acetate is added dropwise over a period of 1 hour. Final polymerisation is carried out for 10 hours at 85° C. The emulsifier is then ready for use.

4 parts of the emulsifier and 2 parts of azodiisobutyronitrile are dissolved in 200 parts by volume of styrene. 50 parts by volume of water are then emulsified into this solution with the aid of a high-speed stirred device. A thinly liquid, milky, reversed emulsion is obtained, which can be dispersed in water.

100 parts by volume of this emulsion are now stirred for 24 hours at 45° C. in 1400 parts by volume of water, to which 100 parts by volume of 5% polyvinyl alcohol solution have been added, the stirring taking place so slowly that the droplets of the reversed emulsion are moved and are not broken. The polymerisation is then completed at 55° C. in another 24 hours.

The polymer particles are filtered, washed several times with water until clear and thereafter dried in a hot air chamber at 80° C.

From the polymer, which has a K value of 44.8, pressed elements are prepared and shaped into test elements. The test elements are transparent and have a softening point according to Vicat of 118° C. As emulsifying auxiliary for preparation of the reversed emulsion instead of the aforementioned graft copolymer there may be employed without disadvantage magnesium-oleate in an amount of 10% by weight related on the total amount of monomers.

Example 2

2 parts of the emulsifier described under (1) and 1 part of lauroyl peroxide are dissolved in 200 parts of methyl methacrylate. 200 parts by volume of water are then emulsified therein. This reversed emulsion is dispersed in 1400 parts by volume of water, to which are added 100 parts by volume of 5% polyvinyl alcohol solution and polymerisation takes place at 45° C. with exclusion of air.

After working up, the polymer provides transparent pressed elements with a softening point according to Vicat of 134° C.

Example 3

6 parts of emulsifier as described in Example 1 are dissolved in 200 parts of styrene. By means of a grid-type stirrer which circulates rather than breaks up the mixture, a solution of 2 parts of potassium persulphate in 800 parts by volume of water and thereafter a solution of 2 parts of sodium pyrosulphite in 800 parts by volume of water are emulsified into the mixture. A creamy, reversed emulsion is obtained. This is dispersed in 400 parts by volume of water while stirring slowly, until after one week the polymerisation is completed and it is no longer possible to detect any styrene odor. The polymer is formed as irregular lumps. These are finely ground, washed carefully several times with water until free from salt and pressed. The pressed elements have a Vicat softening point of 128° C. After being dissolved in ethyl acetate and after precipitating the solution in 80% aqueous methanol, a product is obtained which provides transparent pressed elements with a softening point of 125° C.

*Example 4*

A solution of the following components (in parts by weight) is prepared:

81 parts of styrene, 5 parts of emulsifier (according to Example 1), 8 parts of maleic acid cyclohexal semiester, 6 parts of polyester of maleic acid and butylene glycol with a molecular weight of about 5000. First of all, a solution of 2 parts of potassium persulphate in 500 parts by volume of water are emulsified into this solution, followed by a solution of 2 parts of sodium pyrosulphite in 300 parts by volume of water. Another 200 parts by volume of the last-mentioned solution are now incorporated by stirring, and the reversed emulsion, which initially had a homogeneous creamy consistency, breaks up into individual small particles. The mixture is left standing without further stirring. After 24 to 36 hours, the polymerisation is completed at room temperature. The polymer block which has formed consists of individual polymer particles which have a diameter of about 0.5 mm. and into which it breaks under gentle pressure.

*Example 5*

As emulsifier, there is used an alternating copolymer of maleic acid cyclohexyl semiester and isoprene, which has been esterified with propylene oxide to a content of 3.5% OH. 3 parts of this emulsifier are dissolved with 1 part of azodiisobutyronitrile in 97 parts of styrene. 300 parts of water are now incorporated by emulsification and the reversed emulsion is dispersed with careful stirring in 2000 parts of water, to which successively 50 parts of $MgSO_4 \cdot 7 H_2O$ and 200 parts by volume of normal sodium hydroxide solution have been added. While passing over nitrogen, polymerisation takes place for 24 hours at 50° C. and then for 10 hours at 65° C. Acidification is carried out with HCl, the polymer particles are filtered off and washed with water until neutral. After drying, the polymer is pressed to form test elements which have a Vicat value of 113° C. Martens value: 84° C.

We claim:
1. Process which comprises the steps of forming a water-in-oil emulsion comprising a monomer selected from the group consisting of styrene, an ester of methacrylic acid with an aliphatic saturated monohydric alcohol having from 1 up to 6 carbon atoms, and an ester of acrylic acid with an aliphatic saturated monohydric alcohol having from 1 up to 6 carbon atoms as the dispersion medium and water as the disperse phase in the presence of 0.1 to 30% by weight, based on the weight of said monomer, of an emulsifier, the weight ratio of monomer to water in said reversed emulsion being between 100:5 and 1:80, forming a dispersion of said water-in-oil emulsion as the disperse phase in an aqueous dispersion medium, the volume ratio of said water-in-oil emulsion of said disperse phase and the said aqueous dispersion medium being between 3:1 and 1:40, and thereafter polymerizing resulting dispersion in the presence of a catalytic amount of a polymerization catalyst for said monomer.

2. Process according to claim 1 which comprises using a weight ratio of monomer to water in said water-in-oil emulsion between 100:10 and 1:20.

3. Process according to claim 1 which comprises using as said emulsifier a member selected from the group consisting of slightly hydrophilic fatty acid salts, graft polymer of monovinyl compounds and polyethylene oxides and reaction products of alpha,beta-ethylenically unsaturated dicarboxylic acids, esters and anhydrides thereof with alkylene oxide.

4. Process according to claim 1, which comprises using as emulsifier for preparation of the water-in-oil emulsion a reaction product of (a) a copolymer of a semi-ester of an $\alpha,\beta$-ethylenically unsaturated dicarboxylic acid with a conjugated diolefine having 4 to 6 carbon atoms and (b) an alkylene oxide wherein at least 10% of the carboxyl groups of the polymer are esterified by reaction with said alkylene oxide.

5. Process according to claim 1, which comprises using as emulsifier for preparation of the water-in-oil emulsion an alkaline earth metal salt of a fatty acid having between 12 and 20 carbon atoms.

6. Process according to claim 1, which comprises using as emulsifier for preparation of the water-in-oil emulsion a polymer obtained by grafting 1 to 50 parts by weight of a monovinyl compound on to 2 to 1 parts by weight of a polyalkylene oxide having a molecular weight of at least 500.

7. Process according to claim 1, which comprises using as emulsifier for preparation of the water-in-oil emulsion a reaction product of a copolymer of an $\alpha,\beta$-ethylenically unsaturated dicarboxylic acid and an alkylene oxide wherein at least 10% of the carboxyl groups of the polymer are esterified by reaction with said alkylene oxide.

8. Process according to claim 1, which comprises using as emulsifier for preparation of the water-in-oil emulsion a reaction product of (a) a copolymer of a semi-ester of an $\alpha,\beta$-ethylenically unsaturated dicarboxylic acid with styrene and (b) an alkylene oxide wherein at least 10% of the carboxyl groups of the polymer are esterified by reaction with said alkylene oxide.

References Cited by the Examiner
UNITED STATES PATENTS

| | | | |
|---|---|---|---|
| 2,606,164 | 8/1952 | Henson et al. | 260—23 |
| 2,932,629 | 4/1960 | Wiley | 260—93.5 |
| 2,933,469 | 4/1960 | Borunsky | 260—93.5 |
| 2,982,749 | 5/1961 | Friedrich et al. | 260—23 |

JOSEPH L. SCHOFER, *Primary Examiner.*

DONALD E. CZAJA, LESLIE WOLF,
*Assistant Examiners.*